US005303459A

United States Patent [19]

Kurakake

[11] Patent Number: 5,303,459

[45] Date of Patent: Apr. 19, 1994

[54] METHOD FOR MANUFACTURING PRECISELY FOCUSED COLLIMATOR

[75] Inventor: Tadakazu Kurakake, Tokyo, Japan

[73] Assignee: Kabushiki Kaisha Toshiba, Tokyo, Japan

[21] Appl. No.: 858,490

[22] Filed: Mar. 27, 1992

[30] Foreign Application Priority Data

Mar. 27, 1991 [JP] Japan ............................... 3-063524

[51] Int. Cl.[5] ............................................ B23Q 17/00

[52] U.S. Cl. ..................................... 29/407; 29/469.5; 29/527.6

[58] Field of Search ................ 29/407, 412, 413, 414, 29/415, 416, 417, 469.5, 527.6, 527.5; 156/221, 222, 196; 250/363.1, 505.1; 378/147, 149, 154

[56] References Cited

U.S. PATENT DOCUMENTS

| | | | |
|---|---|---|---|
| 2,122,135 | 6/1938 | Freeman . | |
| 3,645,606 | 2/1972 | LaVantine | 29/407 X |
| 3,701,521 | 10/1972 | LaVantine | 29/283 X |
| 4,056,427 | 11/1977 | York et al. | 29/238 X |
| 5,099,134 | 3/1992 | Hase et al. . | |

FOREIGN PATENT DOCUMENTS

| | | |
|---|---|---|
| 0212416 | 3/1987 | European Pat. Off. . |
| 662046 | 11/1951 | United Kingdom . |

OTHER PUBLICATIONS

Nuclear Fields Brochure, "Precision Micro-cast Collimators", 9 pages.

Nuclear Fields Brochure, "Micro-cast collimators and associated nuclear medical products", 8 pages.

Applied Optics, vol. 20, No. 20, Oct. 1981, pp. 3630-3634, R. Hoekstra, et al., "Optical Alignment Of An X-Ray Collimator".

*Primary Examiner*—Timothy V. Eley

*Attorney, Agent, or Firm*—Oblon, Spivak, McClelland, Maier & Neustadt

[57] ABSTRACT

A method for manufacturing single focus and cone beam collimators with precisely focused focal line or focal point. The method includes the steps of: forming a collimator body by using a metal casting process; measuring a displacement of a focal position of the collimator body with respect to an intended focal position; determining an adjustment size to minimize the measured displacement; adjusting the focal position of the collimator body by changing a physical size of peripheral regions of the collimator body according to the determined adjustment size. In this method, the physical size of peripheral regions of the collimator body can be changed either by cutting or attaching peripheral adjustment portions. Also, the physical size of peripheral regions of the collimator body can be changed to tilt an optical axis of the collimator body. The method should preferably be applied to segments of the collimator body separately.

10 Claims, 6 Drawing Sheets

METHOD FOR MANUFACTURING PRECISELY FOCUSED COLLIMATOR

BACKGROUND OF THE INVENTION

1. Field of the Invention

The present invention relates to a collimator to be used in a nuclear medical apparatus such as a SPECT (Single Photon Emission Computed Tomography) apparatus, and a method for manufacturing such a collimator.

2. Description of the Background Art

In a nuclear medical apparatus such as a SPECT apparatus, γ rays emitted from radioactive materials deposited inside a body to be examined are detected, and an image of a distribution of the radioactive materials inside the body is obtained on a basis of the detected γ ray signals, where the obtained image is utilized in the diagnosis of a cancer and a tumor. In such a nuclear medical apparatus, a collimator is attached on a detector device in order to selectively collect the γ rays from the radioactive materials inside the body at the detector device. The γ rays selectively collected at the detector device by using the collimator are then converted into light signals and then into electric signals by using a scintillator, and the obtained electric signals corresponding to the detected γ rays are utilized as the image data in the image reconstruction process.

For such a collimator to be used in a nuclear medical apparatus, there are several types including a parallel hole collimator in which all the holes arranged in an array are parallel to each other, and a single focus (fan beam) collimator in which each hole in an array is provided with a prescribed inclination angle such that the collimator as a whole has a focal line in order to improve the sensitivity and the resolution of the collimator.

In the SPECT apparatus for the head portion diagnosis, three such collimators are used in an arrangement in which each collimator is located on each side of an equilateral triangle formed by detectors arranged around the head portion of a patient.

Among such a collimator to be used in the SPECT apparatus, the single focus collimator has an increasing demand in recent years because of its usefulness in the SPECT apparatus for brain, but has been rather difficult to manufacture with high precision conventionally, because each hole in the array must be manufactured to be oriented toward a single focal line. This single focus collimator has usually been manufactured by the following manufacturing method using pins.

Namely, in the conventional manufacturing method using pins, approximately thirty to fifty thousand pins each in a shape of a hole of a collimator to be manufactured are mounted between two templates with pre-manufactured pin positions in an array such that all the pins are oriented toward a predetermined single focal line, and then the lead is casted between the templates with the pins mounted, such that a desired single focus collimator body with all the holes arranged in an array oriented toward the predetermined single focal line can be obtained by pulling out all the pins after the lead casting.

However, such a conventional method of manufacturing a single focus collimator has been associated with the problem that the precision of the manufactured single focus collimator is often deteriorated by the bending of the very thin templates due to the weights of the pins, and by the inaccuracy of the pin orientation due to the looseness of the fitting of the pins at the pin positions on the templates. In particular, the precision of the single focus collimator manufactured by this conventional method using pins has been rather poor because of the poor manufacturing precision due to the above described reasons and of the deformation due to the heat produced in the lead casting process, such that the focal line is often not precisely focused. When such a single focus collimator having not precisely focused focal line is used in the SPECT apparatus, the image quality of the SPECT image obtained by the SPECT apparatus is deteriorated considerably.

The similar problem also existed for a conventional cone beam collimator in which the focal point is often not precisely focused.

In general, the collimator manufactured by using the metal casting process has a poor focus precision.

SUMMARY OF THE INVENTION

It is therefore an object of the present invention to provide a method for manufactu-ing single focus and cone beam collimators which have precisely focused focal line or focal point.

It is another object of the present invention to provide single focus and cone beam collimators which have precisely focused focal line or focal point.

According to one aspect of the present invention there is provided a method of manufacturing a collimator, comprising the steps of: forming a collimator body by using a metal casting process; measuring a displacement of a focal position of the collimator body formed at a forming step with respect to an intended focal position; determining an adjustment size to minimize the displacement measured at the measuring step; adjusting the focal position of the collimator body by changing a physical size of peripheral regions of the collimator body according to the adjustment size determined at the determining step.

According to another aspect of the present invention there is provided a collimator manufactured by the method as described above.

Other features and advantages of the present invention will become apparent from the following description taken in conjunction with the accompanying drawings.

DETAILED DESCRIPTION OF THE PREFERRED EMBODIMENTS

Figure 1:
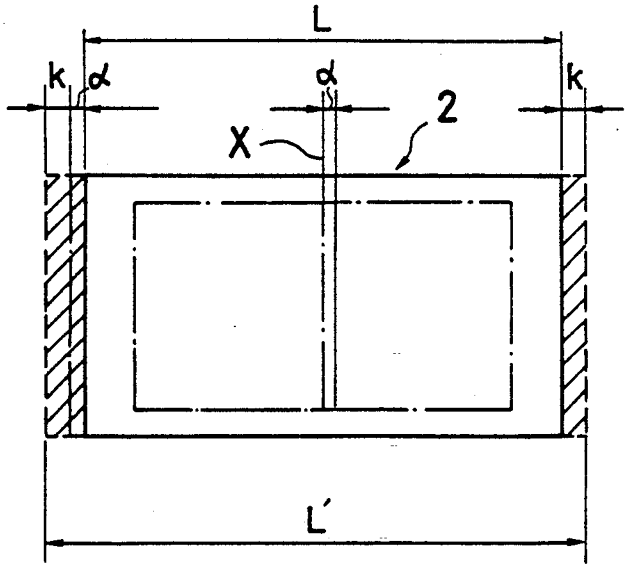
FIG. 1 is a plan view of a single focus collimator body to be applied with the adjustment of the focal line according to one embodiment of the present invention, showing the adjustment to be made.

Referring now to FIG. 1, one embodiment of a method for manufacturing a single focus collimator according to the present invention will be described.

In general, a single focus collimator manufactured by using the metal casting process has a poor focus precision due to an insufficient manufacturing precision, such that the actual focal line realized in the manufactured single focus collimator fluctuates within a range of approximately ±5 mm on both sides of the intended focal line.

In this embodiment, such a fluctuation of the focal line is corrected as follows.

First, as shown in FIG. 1, when an original unadjusted single focus collimator is prepared by using the metal casting process, a collimator body 2 is formed to have a length L′ in a direction perpendicular to the intended focal line X which is larger than an intended final collimator body size L in order to provide peripheral adjustment portions on both ends in the direction perpendicular to the intended focal line X.

Figure 2:
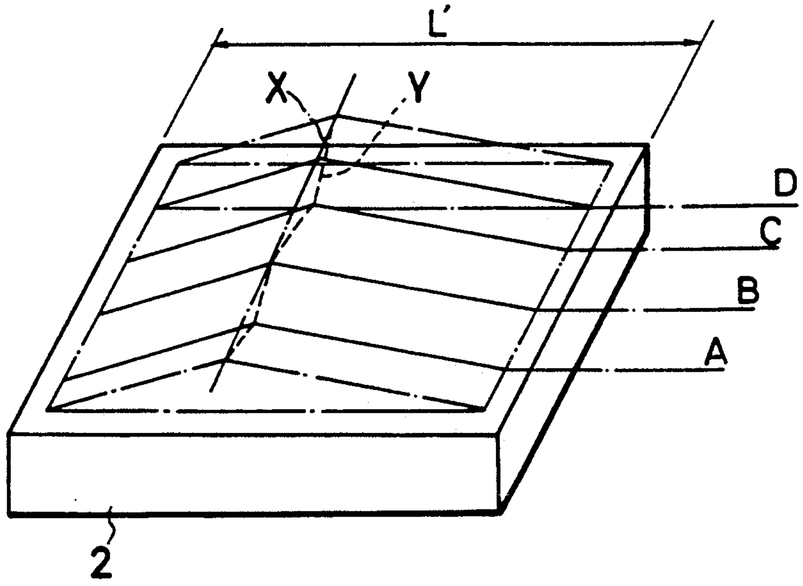
FIG. 2 is a perspective view of the single focus collimator body of FIG. 1 indicating the actual focal line measured and the intended focal line.
Figure 3:
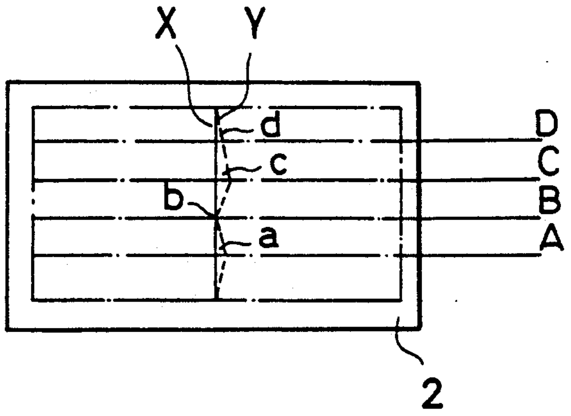
FIG. 3 is a plan view of the single focus collimator of FIG. 1 indicating displacements of the actual focal line with respect to the intended focal line.

Then, as shown in FIG. 2, the actual focal line Y of the prepared collimator body 2 is optically measured at a plurality (four in this embodiment) of sections A, B, C, and D along the intended focal line X, in order to obtain the displacements a, b, c, and d of the actual focal line Y with respect to the intended focal line X at the sections A, B, C, and D, respectively, as shown in FIG. 3.

Here, the optical measurement of the actual focal line Y of the prepared collimator body 2 can be carried out as follows.

Figure 4:
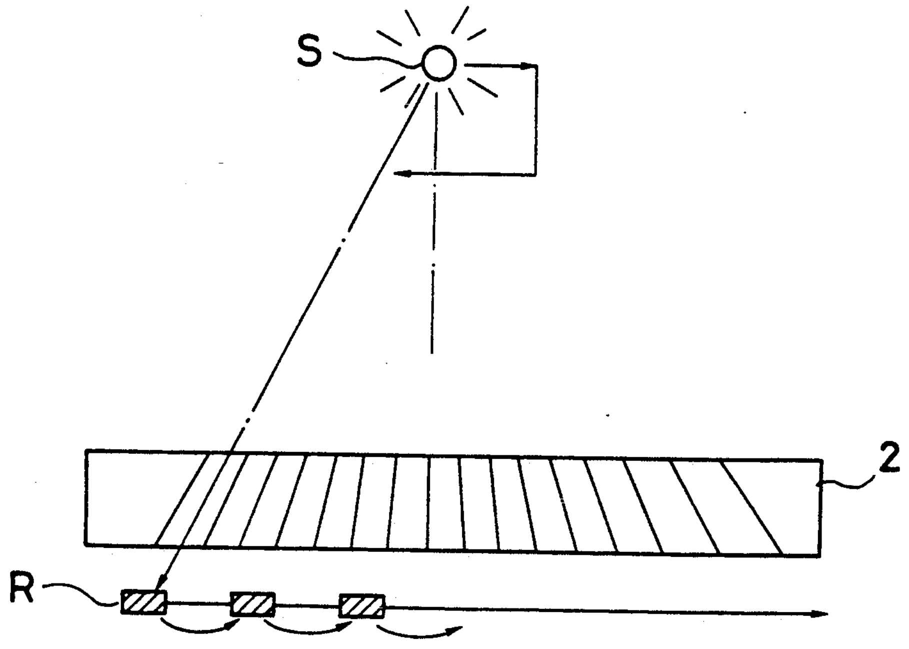
FIG. 4 is a schematic diagram of an optical measurement of the actual focal line to be carried out in one embodiment of the present invention.
Figure 5:
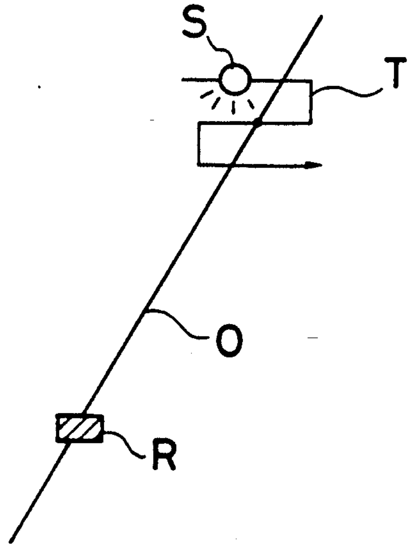
FIG. 5 is a diagram indicating a manner of determining the optical axis in the optical measurement of the actual focal line shown in FIG. 4.

Namely, as shown in FIG. 4, for each section of the collimator body 2, the light emitted from a light source S located above the collimator body 2 in a vicinity of the intended focal line X is received by a receiver R located below a hole of the collimator body 2 to measure the light level of the light source S. In this measurement of the light level of the light source S, the light source S is moved along a zigzag trajectory T as shown in FIG. 5 while the light level is measured by the receiver R, and the optical axis O is determined by joining the receiver R and the light source S at a position on the trajectory T at which the measured light level is the highest.

Such an optical measurement of the actual focal line Y of the prepared collimator body 2 enables an easy determination of the actual focal line Y.

Next, according to the measured displacements a, b, c, and d of the actual focal line Y with respect to the intended focal line X, a focal line adjustment size $\alpha$ is determined. Here, in a case all the measured displacements a, b, c, and d are located on one side of the intended focal line X as shown in FIG. 3, an average of these measured displacements a, b, c, and d is taken as the focal line adjustment size $\alpha$, i.e., $\alpha=(a+b+c+d)/4$. On the other hand, in a case the measured displacements are distributed on both sides of the intended focal line X, the focal line adjustment size $\alpha$ is obtained by the least square fit to minimize the displacements. In the following, it is assumed that all the measured displacements a, b, c, and d are located on one side of the intended focal line X as shown in FIG. 3 so that $\alpha=(a+b+c+d)/4$, for the sake of simplicity.

Then, according to the determined focal line adjustment size $\alpha$, a cut size $k=(L'-L-\alpha)/2$ is determined, and as shown in FIG. 1, the peripheral adjustment portions of the collimator body 2 are cut for a length k on one side toward which the focal line X is to be adjusted by $\alpha$ and for a length $k+\alpha$ on opposite side, such that the location of the focal line is adjusted by the focal line adjustment size $\alpha$. In FIG. 1, the shaded portions indicate the peripheral adjustment portions to be cut.

Figure 6:
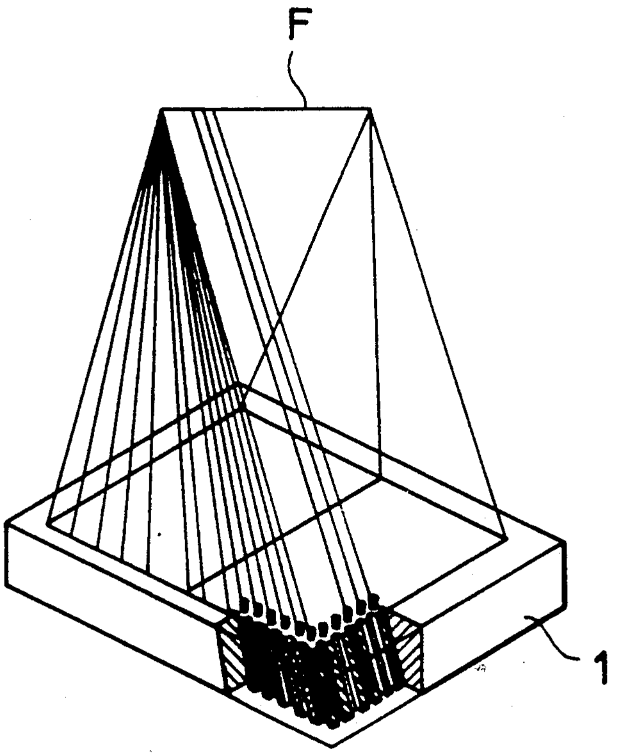
FIG. 6 is a perspective view of a single focus collimator with precisely focused focal line which can be obtained according to one embodiment of the present invention.

As a result, the single focus collimator 1 with a substantially sharply focused focus line F as shown in FIG. 6 can be obtained.

Now, when the unique focal line adjustment size $\alpha$ is determined for the entire collimator body 2 as described above, the correction of the fluctuation of the focal line can be achieved only globally, so that local displacements of the actual focal line may still exist, even though their sizes are substantially reduced compared with the displacements in the original collimator body 2.

Figure 7:
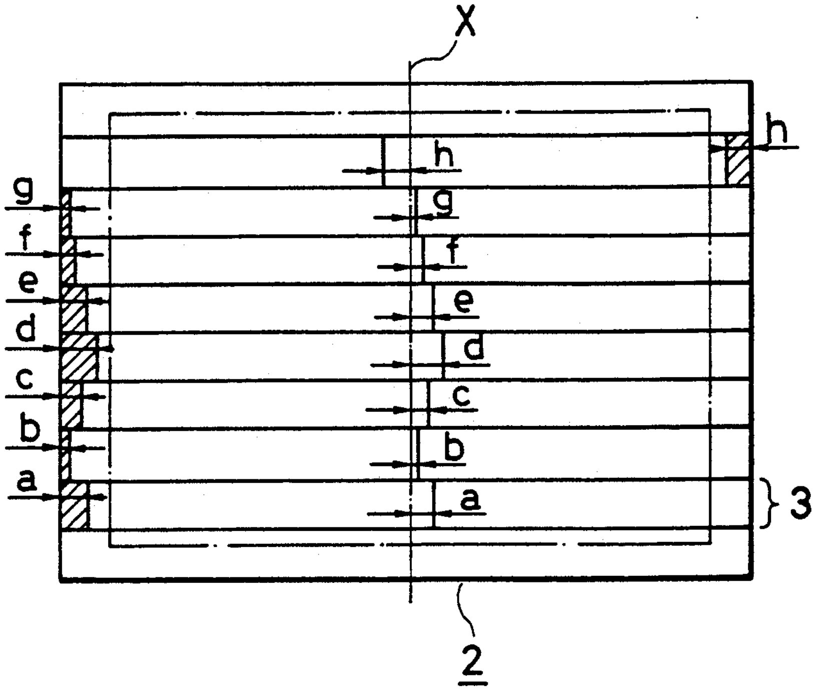
FIG. 7 is a plan view of a single focus collimator body to be applied with the adjustment of the focal line in each segment according to the present invention, showing the displacement of the focal line and the adjustment to be made on the collimator body.

In order to realize the finer adjustment of the focal line on the local scale, the collimator body 2 can be divided into a plurality of segments 3 as shown in FIG. 7, and the procedure for correcting the fluctuation of the focal line similar to that described above can be applied to each of these segments 3 separately.

In this case, as shown in FIG. 7, the displacements a, b, c, d, e, f, g, and h in the segments 3 are optically measured separately, and the peripheral adjustment portions are cut in each segment 3 separately by a length equal to the respective measured displacement on the side opposite to which the actual focal line is displaced with respect to the intended focal line X, and then the segments 3 are assembled together with the focal line aligned along the intended focal line X. In FIG. 7, the shaded portions indicate the peripheral adjustment portions to be cut.

Therefore, according to the present invention, it becomes possible to obtain the cone beam collimator in which the holes are substantially sharply focused to the intended focal line X located at the center of the collimator body.

Figure 8:
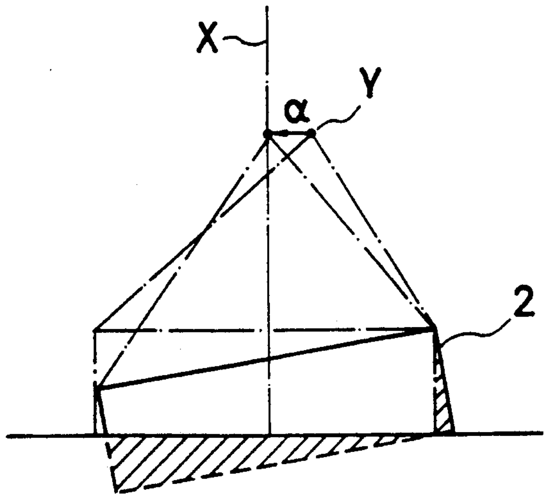
FIG. 8 is a side view of a collimator body to be applied with the adjustment of the focal line by tilting the optical axis according to the present invention, showing the adjustment to be made on the collimator body.

It is to be noted that instead of providing the peripheral adjustment portions on both ends in the direction perpendicular to the intended focal line X as in the embodiment described above, the peripheral adjustment portions may be provided in the direction of the thickness of the collimator body 2 such that the adjustment of the focal line from the original one Y to the intended one X can be achieved by cutting the peripheral adjustment portions in such a manner to tilt the collimator body 2 appropriately, as shown in FIG. 8 in which the shaded portions indicate the peripheral adjustment portions to be cut.

It is also to be noted that instead of providing the peripheral adjustment portions on the collimator body 2 and cutting the peripheral adjustment portions later on to adjust the focal line as in the embodiment described above, the collimator body can be prepared in a size smaller than an intended collimator size first and the adjustment portions can be additionally attached to the collimator body 2 in order to adjust the focal line by the desired focal line adjustment size α.

Such a single focus collimator according to the present invention is intended to be useful primarily in the SPECT apparatus.

Figure 9:
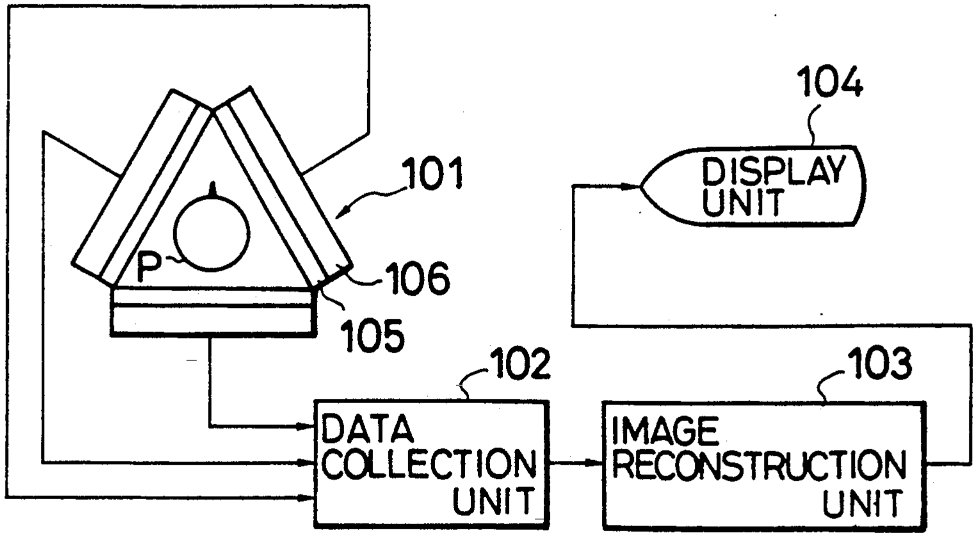
FIG. 9 is a schematic block diagram of a SPECT apparatus in which a collimator according to the present invention is to be used.

More specifically, the SPECT apparatus in which the single focus collimator according to the present invention is to be used has a schematic configuration as shown in FIG. 9. This SPECT apparatus of FIG. 9 comprises: a frame 101 placed around the head portion of the patient P; three γ ray detector devices 106 (each including a scintillator and a photoelectric converter) for detecting the γ rays emitted from radioactive materials deposited inside the patient P and outputting the electric signals corresponding to the detected γ rays, which are mounted on the frame 101 and arranged in a form of an equilateral triangle with the head portion of the patient P located inside; three single focus collimators 105 detachably mounted on the front sides of these γ ray detector devices 106 facing toward the patient P; a data collection unit 102 for collecting the γ rays signals outputted from the γ ray detector devices 106; an image reconstruction unit 103 for carrying out the image reconstruction process by using the detected γ ray signals collected by the data collection unit 102 as the projection image data in order to obtain an image of a distribution of the radioactive materials inside the patient P; and a display unit 104 for displaying the obtained image of a distribution of the radioactive materials inside the patient P for the sake of the diagnosis of a cancer and a tumor.

Now, the above described embodiment of the method for manufacturing a single focus collimator according to the present invention is equally applicable to a method for manufacturing the cone beam collimator, as follows.

Figure 10:
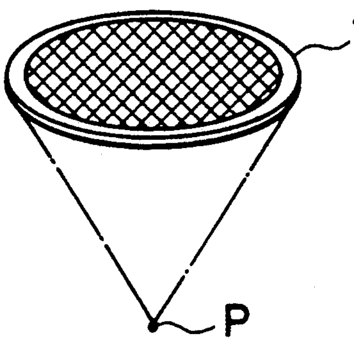
FIG. 10 is a perspective view of a cone beam collimator to be applied with the adjustment of the focal point according to the present invention.

Namely, as shown in FIG. 10, the cone beam collimator 4 has a circular outer shape in which holes are oriented toward a common focal point P. In general, however, a cone beam collimator manufactured by using the metal casting process has a poor focus precision due to an insufficient manufacturing precision, such that the actual focal point realized in the manufactured cone beam collimator is displaced from the intended focal point.

By using the method similar to that described above for a single focus collimator, such a deviation of the focal point in the cone beam collimator is corrected as follows.

Figure 11:
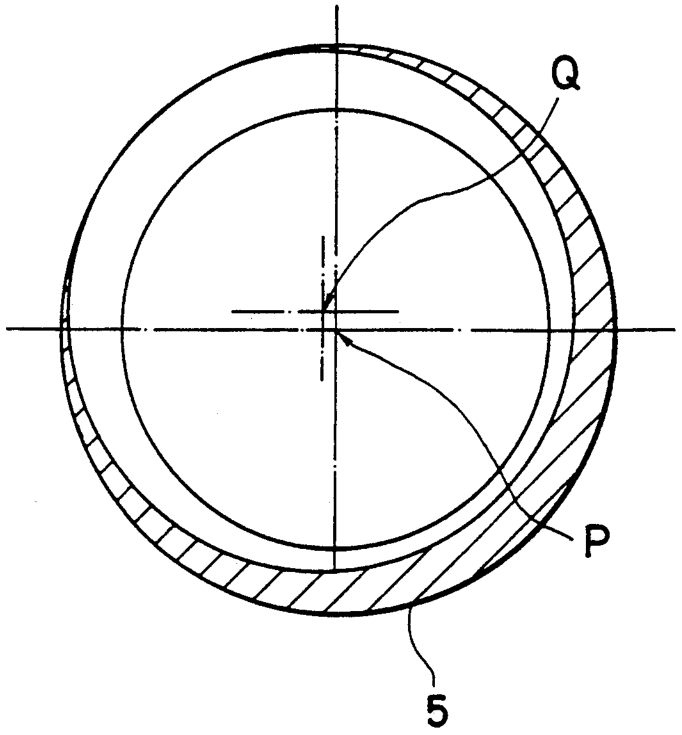
FIG. 11 is a plan view of the cone beam collimator of FIG. 10 indicating the actual focal point and the intended focal point, showing the adjustment to be made on the cone beam collimator body.

First, as shown in FIG. 11, when an original unadjusted single focus collimator is prepared by using the metal casting process, a cone beam collimator body 5 is formed to have an extra diameter larger than an intended diameter of a final cone beam collimator body in order to provide peripheral adjustment portions on both circumferential region of the manufactured cone beam collimator body 5.

Then, the actual focal point Q of the prepared cone beam collimator body 5 is optically measured by a procedure similar to that described above with references to FIGS. 4 and 5.

Then, as shown in FIG. 11, the peripheral adjustment portions of the prepared cone beam collimator body 5 are cut such that the obtained cone beam collimator body in the intended final diameter has the actual focal point Q at the center, where the shaded portion indicates the cut portion in FIG. 11.

Therefore, according to the present invention, it becomes possible to obtain the cone beam collimator in which the holes are sharply focused to the actual focal point Q located at the center of the collimator body.

It is to be noted that, just as in a case of a single focus collimator described above, instead of providing the peripheral adjustment portions on the circumferential region of the collimator body 5, the peripheral adjustment portions may be provided in the direction of the thickness of the collimator body 5 such that the adjustment of the focal point from the original one Q to the intended one P can be achieved by cutting the peripheral adjustment portions in such a manner to tilt the collimator body 5 appropriately, in a manner similar to that shown in FIG. 8.

It is also to be noted that, just as in a case of a single focus collimator described above, instead of providing the peripheral adjustment portions on the collimator body 5 and cutting the peripheral adjustment portions later on to adjust the focal point, the collimator body 5 can be prepared in a size smaller than an intended collimator size first and the adjustment portions can be additionally attached to the collimator body 5 in order to adjust the focal point.

Such a cone beam collimator according to the present invention is also intended to be useful primarily in the SPECT apparatus already described above.

Besides those already mentioned above, many modifications and variations of the above embodiments may be made without departing from the novel and advantageous features of the present invention. Accordingly, all such modifications and variations are intended to be included within the scope of the appended claims.

What is claimed is:

1. A method of manufacturing a collimator, comprising the steps of:
   - forming a collimator body by using a metal casting process;
   - measuring any existing displacement of a focal position of the collimator body formed at the forming step with respect to an intended focal position;
   - determining an adjustment size to minimize the displacement measured at the measuring step;
   - changing a physical size of peripheral regions of the collimator body according to the adjustment size, determined at the determining step, so as to adjust the focal position of the collimator body.

2. The method of claim 1, further comprising the steps of:
   - dividing the collimator body into a plurality of segments after the forming step and before the measuring, determining, and adjusting steps, where the measuring, determining, and adjusting steps are carried out for each of the plurality of segments separately; and combining the plurality of segments after the measuring, determining, and adjusting steps are carried out for all of the plurality of segments, in order to obtain the collimator body with the focal position adjusted.

3. The method of claim 1, wherein at the forming step the collimator body is formed with peripheral adjustment portions in excess of an intended collimator size, and at the adjusting step the physical size of peripheral regions of the collimator body is changed by cutting the peripheral adjustment portions of the collimator body formed at the forming step according to the adjustment size determined at the determining step.

4. The method of claim 1, wherein at the forming step the collimator body is formed in a size smaller than an intended collimator size, and at the adjusting step the physical size of peripheral regions of the collimator body is changed by attaching peripheral adjustment portions to the collimator body formed at the forming step according to the adjustment size determined at the determining step.

5. The method of claim 1, wherein at the adjusting step the physical size of peripheral regions of the collimator body is changed such that an optical axis of the collimator body is tilted according to the adjustment size determined at the determining step.

6. The method of claim 1, wherein at the measuring step, the displacement of the focal position of the collimator body is measured optically.

7. The method of claim 1, wherein at the measuring step the displacement of the focal position of the collimator body is measured at each of a plurality of sections of the collimator body separately, and at the determining step the adjustment size is determined as an average of the displacements measured for the plurality of sections of the collimator body.

8. The method of claim 1, wherein at the measuring step the displacement of the focal position of the collimator body is measured at each of a plurality of sections of the collimator body separately, and at the determining step the adjustment size is determined as a least square fit of the displacements measured for the plurality of sections of the collimator body.

9. The method of claim 1, wherein the collimator to be manufactured is a single focus collimator for which the focal position is defined by a focal line.

10. The method of claim 1, wherein the collimator to be manufactured is a cone beam collimator for which the focal position is defined by a focal point.

* * * * *